United States Patent
Sashino et al.

(10) Patent No.: US 6,701,323 B2
(45) Date of Patent: Mar. 2, 2004

(54) OBJECT MANAGEMENT SYSTEM AND METHOD FOR DISTRIBUTED OBJECT SYSTEM

(75) Inventors: Atsushi Sashino, Yokohama (JP); Motoaki Iwasaki, Hiratsuka (JP); Yuuichiro Chaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 259 days.

(21) Appl. No.: 09/772,294

(22) Filed: Jan. 29, 2001

(65) Prior Publication Data

US 2001/0032239 A1 Oct. 18, 2001

(30) Foreign Application Priority Data

Apr. 18, 2000 (JP) ........................ 2000-122372

(51) Int. Cl.[7] .............. G06F 17/30; G06F 9/00
(52) U.S. Cl. ............... 707/103 R; 707/10; 709/105; 709/203
(58) Field of Search ............... 707/10, 103 R, 707/102; 709/105, 203, 219, 223, 224, 226, 229

(56) References Cited

U.S. PATENT DOCUMENTS

| | | | | |
|---|---|---|---|---|
| 5,566,302 A | * | 10/1996 | Khalidi et al. | 709/312 |
| 5,987,471 A | * | 11/1999 | Bodine et al. | 707/103 R |
| 6,105,069 A | * | 8/2000 | Franklin et al. | 709/229 |
| 6,209,018 B1 | * | 3/2001 | Ben-Shachar et al. | 709/105 |
| 6,289,382 B1 | * | 9/2001 | Bowman-Amuah | 709/226 |
| 6,578,068 B1 | * | 6/2003 | Bowman-Amuah | 709/203 |
| 6,591,272 B1 | * | 7/2003 | Williams | 707/102 |
| 6,615,253 B1 | * | 9/2003 | Bowman-Amuah | 707/100 |

FOREIGN PATENT DOCUMENTS

| | | | | |
|---|---|---|---|---|
| JP | 05210612 | 8/1993 | | G06F/13/00 |
| JP | 06332830 | 12/1994 | | G06F/13/00 |
| JP | 09167097 | 6/1997 | | G06F/9/46 |
| JP | 10040118 | 2/1998 | | G06F/9/46 |
| JP | 11327876 | 11/1999 | | G06F/9/06 |

* cited by examiner

Primary Examiner—Shahid Alam
(74) Attorney, Agent, or Firm—Antonelli, Terry, Stout & Kraus, LLP

(57) ABSTRACT

A distributed object system having a load balancing feature that can be expanded by adding a new computer to the cluster of server computers. Objects can be activated and deactivated and system service alteration is performed by renewing objects. By request from a client, the object invocation unit obtains object code and object data from the object access unit in response to remote object invocation, executes the requested method, and requests the object access unit to overwrite the object data. The object manager unit activates or deactivates an object.

11 Claims, 15 Drawing Sheets

FIG. 7

| Object Code Identifier | Number of Objects | Status | Object Code |
|---|---|---|---|
| AAA | 2 | ON | Code for AAA |
| BBB | 1 | OFF | Code for BBB |
| ... | ... | ... | ... |
| ... | ... | ... | ... |

| Object Data Identifier | Object Code Identifier | Object Use Flag | Object Data |
|---|---|---|---|
| 100 | AAA | In-Use | Data for 100 |
| 101 | AAA | Unused | Data for 101 |
| 200 | BBB | In-Use | Data for 200 |
| ... | ... | ... | ... |

| Server-Machine Identifier | Load Information |
|---|---|
| a | Load on Machine a |
| b | Load on Machine b |
| ... | ... |
| ... | ... |

600, 610, 620

OBJECT MANAGEMENT SYSTEM AND METHOD FOR DISTRIBUTED OBJECT SYSTEM

BACKGROUND OF THE INVENTION

Balancing the load of handling remote object invocation in a conventional distributed object system is implemented by evenly object access permissions among client-run computers. For instance, objects are activated in advance on a plurality of server-run computers and a means to control the access to the active objects is provided on any server-run computer. In response to requests for object access from user programs on client-run computers, the above means evenly returns object access permissions to the clients. Once having obtained the object access permission, the user programs on client-run computers initiate remote object invocation. A technique of this type is described in, for example, Japanese Patent Laid-Open Publication No. Hei 10-40118.

For such system operating in LAN or WAN environments, variation of the traffic for accessing a server from client-run computers is relatively small and therefore expanding the cluster of server-run computers is not often required. Alteration to services provided by the cluster of server-run computers is less required.

Meanwhile, for such system built by using the Internet, rapid change of the traffic for accessing servers from client-run computers occurs. It often happens that the capacity of the cluster of sever-run computers becomes insufficient because of rapid increase of the traffic for accessing a server from the client-run computers after a distributed object system using the Internet is built. In the event of such over-traffic condition, the cluster of the server-run computers must be expanded so as to be capable of handing the traffic for accessing a server from the client-run computers.

BRIEF SUMMARY OF THE INVENTION

Previous techniques, however, do not disclose a simple method of adding a new object, which is to run on server-run computers, to server-run computers.

For a distributed object system by using the Internet, services provided by server-run computers change frequently. Consequently, it often happens that after such system is built, system alternation is made by renewing objects on server-run computers. Previous techniques, however, do not disclose a simple method of activating or deactivating objects distributed on a plurality of server-run computers.

An object of the present invention is to provide a distributed object system provided with a load balancing feature, wherein easy addition and expansion of objects to run on a new server-run computer are possible.

Another object of the invention is to provide a distributed object system provided with a load balancing feature, wherein objects can easily be activated and deactivated and system service alteration is possible by renewing objects.

In order to attain the above objects, the invention was devised to provide a distributed object system with the load balancing feature and make the system work as follows. With an object being not active on the sever-run computers in advance, on one of the server-run computers, object code and object data are obtained from a managing computer in response to a remote object invocation from a client-run computer and the required method of the object is executed, and moreover the managing computer is requested to over- write the object data. Therefore, when a server-run computer is added to the cluster of the server-run computers due to insufficient capacity, it is not necessary to activate objects in advance on the new server-run machine.

In order to attain the above objects, in the distributed object system provided with a load balancing feature, objects are activated or deactivated only on the managing computer without being done on a plurality of server-run computers. Thus, object exchange can be performed by simple operation, when an object is renewed, it is deactivated on the managing computer, replaced by a new object, and the new object is activated there.

Other and further objects, features and advantages of the invention will appear more fully from the following description.

BRIEF DESCRIPTION OF THE DRAWINGS

A preferred form of the present invention is illustrated in the accompanying drawings in which:

FIG. 7 shows the object code table;

FIG. 8 shows the object data table;

FIG. 9 shows the load table;

DETAILED DESCRIPTION OF THE PREFERRED EMBODIMENTS

A first preferred embodiment of the present invention will be described in detail below with reference to the drawings.

Figure 1:
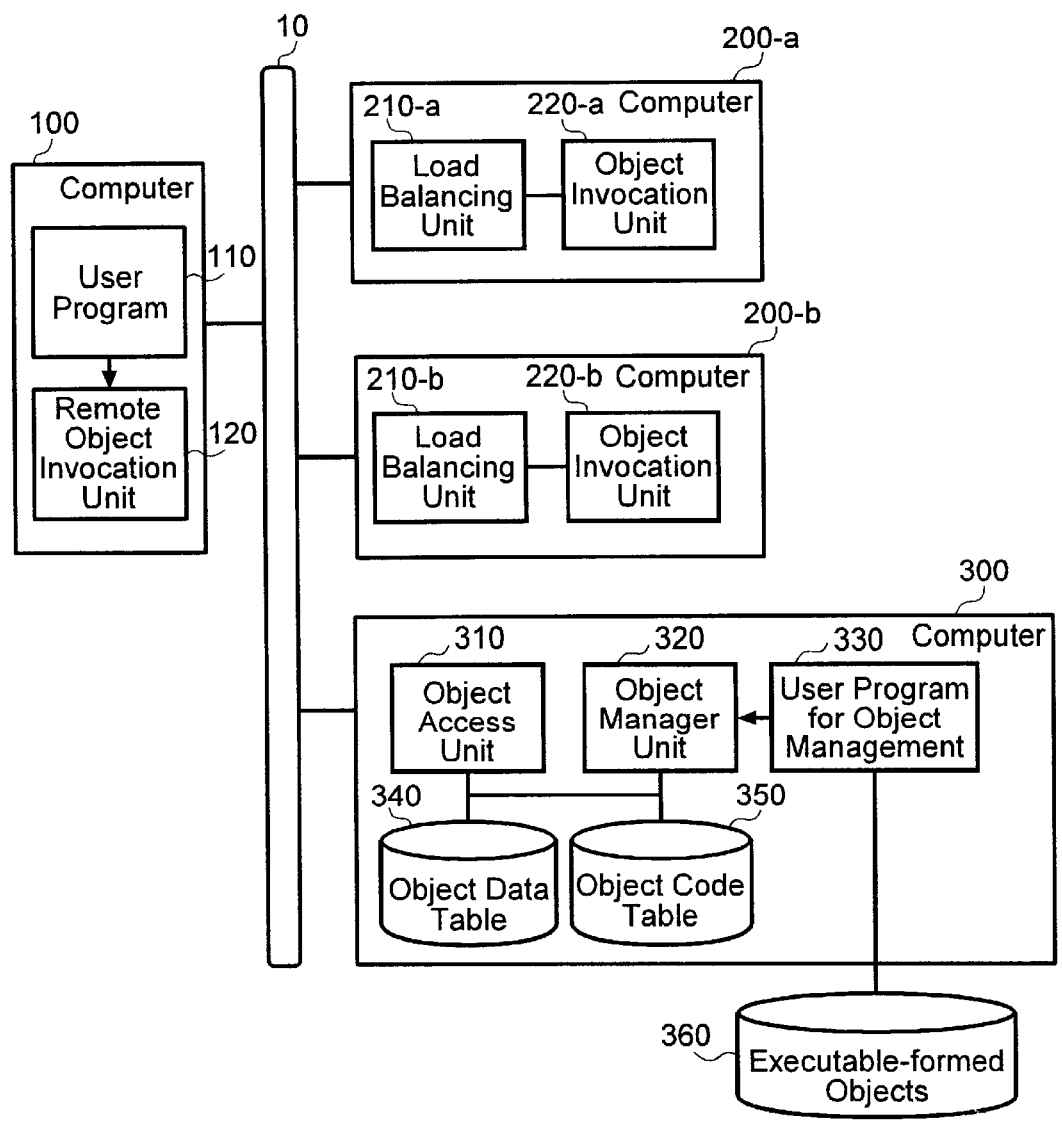
FIG. 1 is an overall system structure diagram showing a distributed object system configured, according to a preferred embodiment of the present invention.

FIG. 1 shows a distributed object system configured, according to a preferred embodiment of the present invention. This distributed object system model embodiment comprises computers 100, 200-*a*, 200-*b*, and 300 interconnected across a network 10.

The computer 100 is a client-run computer that comprises a user program 110 and a remote object invocation unit 120. The user program 110 initiates remote invocation of an object on a server-run computer with a method whose name is specified by the user. The remote object invocation unit 120 generates a request message 700, which is presented in FIG. 6, for remote object invocation with the message contents being supplied from the user program 110, sends the request message to a load balancing unit 210-*a* or 210-*b* on a server-run computer, and receives the result of method execution in accordance with the request message 700. The user program 110 is a remote object invocation executing program that allows the user to specify data such as a method name and arguments to be passed to the method.

In a system, for instance, comprising client programs that use objects on server-run computers from a remote place and objects managed under servers that are remotely accessed from a program on a client-run server, a client program is equivalent to the user program 110. In a distributed object system, for instance, comprising HTML-format files containing hypertexts with links for remote object invocation, WWW browsers, on the window of which HTML-format file contents are displayed, WWW servers that accepts a request from a WWW browser and returns an HTML-format file to the browser, and objects to run as programs that are executed via a WWW server upon the selection of a link in an HTML-format file hypertext, an HTML-format file invoked on the WWW browser window is equivalent to the user program 110.

The computer 200-*a* is a server-run computer that invokes a specific object in response to a request for remote object invocation from the client-run computer 100 and executes the requested method of the object.

The load balancing unit 210-*a* receives a request message 700 and selects a server-run computer that performs the task of object invocation and method execution, based on load information. If the thus selected server-run computer is the local server-run computer 200-*a*, the load balancing unit transfers the request message 700 to its local object invocation unit 220-*a*. If the selected server-run computer is another server-run computer 200-*b*, the load balancing unit transfers the request message 700 to the object invocation unit 220-*b* of another server-run computer 200-*b*.

Figure 6:
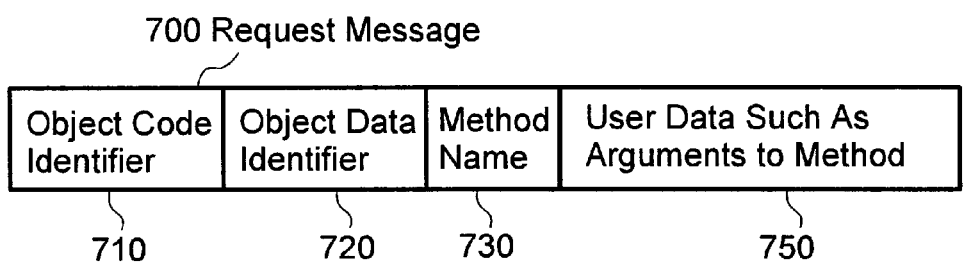
FIG. 6 shows the format of a request message.

Upon receiving the request message from the load balancing unit 210-*a* on its local server-run computer 200-*a* or the load balancing unit 210-*b* of another server-run computer 200-*b*, the object invocation unit 220-*a* derives an object code identifier 710, an object data identifier 720, and a method name 730 from the request message 700, which is presented in FIG. 6, to identify the object to be invoked and the method to be executed, and transfers them to an object access unit on the managing computer 300. Following that, the object invocation unit 220-*a* on the local server-run computer 200-*a* receives object code and object data from the object access unit 310 and executes the requested method.

Furthermore, the object invocation unit 220-*a* on the local server-run computer 200-*a* transfers the object data fixed after the method execution to the object access unit on the managing computer 300. Then, the result of the method execution is transferred to the remote object invocation unit 120 on the client-run computer 100.

The present invention embodiment was devised to make the distributed object system work as follows. With an object being not active on the sever-run computer 200-*a* or 200-*b* in advance, in response to a remote object invocation from the remote object invocation unit 120 on the client-run computer 100, the sever-run computer 200-*a* or 200-*b* obtains object code and object data from the managing computer 300 and executes the requested method of the object, and moreover requests the managing computer 300 to overwrite the object data. Therefore, when a server-run computer is added to the distributed object system because of insufficient capacity of the sever-run computer 200-*a* or 200-*b*, it is not necessary to activate objects in advance and easy system expansion is possible. (Specifically, triggered by a service request from the client-run computer 100, the managing computer 300 downloads the object code and object data of the object required for the service to one of the server-run computer 200-*a*, 200-*b*, and soon and issues the command to activate the downloaded object. Thus, the object need not be active beforehand on any of the server-run computer 200-*a*, 200-*b*, and so on.)

The computer 300 is the managing computer that performs object code and object data management. The object access unit 310 on the managing computer 300 receives an object code identifier 710, an object data identifier 720, and a method name 730 contained in the request message 700 from the object invocation unit 220-*a* on the sever-run computer 200-*a*, obtains the identified object data and object code from an object data table 340 and an object code table 350 respectively, and transfers them to the object invocation unit 220-*a* on the sever-run computer 200-*a*. Moreover, when the object access unit 310 on the managing computer 300 receives processed object data with the object data identifier 720 and the method name 730 specified in the request message 700 from the object invocation unit 220-*a* on the sever-run computer 200-*a*, it writes the processed object data over the corresponding data in the object data table 340.

An object manager unit 320 on the managing computer 300, when requested to activate an object from a user program for object management 330, registers its object code into the object code table 350 and its object data into the object data table 340 and activates the object.

Moreover, the object manager unit 320, when requested to deactivate an object from the user program for object management 330, deletes its object code from the object code table 350 and its object data from the object data table 340 and deactivates the object.

The user program for object management 330 on the managing computer 300 is a program that allows the user to issue a request to activate or deactivate an object. In a distributed object system, for instance, designed such that a command to active an object and a command to deactivate an object with the object code identifier 710 and the object data identifier 720 specified as arguments are used to implement object activation and deactivation, these commands are equivalent to the user program for object management 330. In a system, for instance, designed such that an object manager tool is used to implement object activation and deactivation, the object manager tool is equivalent to the user program for object management 330.

The object code table 340 contains a list of the object codes of active objects.

The object code table 350 contains a list of the object codes of active objects.

Figure 5:
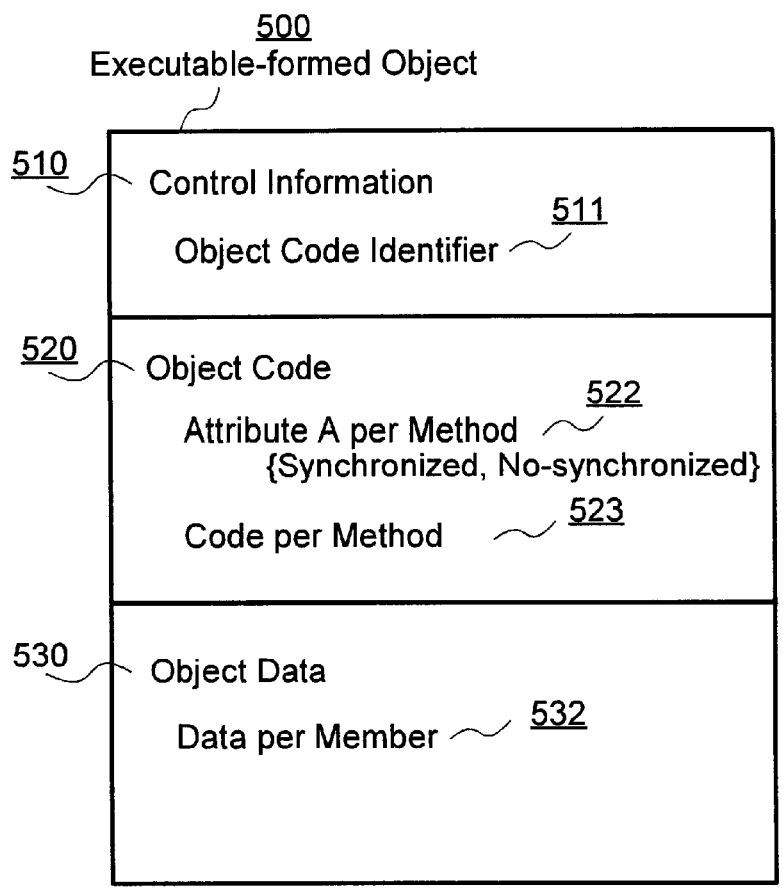
FIG. 5 shows the structure of an executable-formed object.

Executable-formed objects 360 are objects that can be activated on the distributed object system as executable programs represented in accordance with the format of an executable formed object 500 as will be presented in FIG. 5. The executable-formed objects 360 are generated in advance by a translation program such as a compiler from source programs described in an object-oriented programming language or a programming language that enables object description. Before the start of object operation, these objects are installed into the managing computer 300 via a storage device such as files.

In the present invention embodiment, a plurality of server-run computers 200-a and 200-b do not perform object activation and deactivation, but only the managing computer 300 does so. Thus, easy system alternation is possible; when an object is renewed, it is deactivated on the managing computer 300, and then it is replaced by a new object and the new object is activated there.

The server-run computer 200-b comprises the components corresponding to those of the server-run computer 200-a; each component (e.g., 210-b) of the former is identical to the corresponding component (e.g., 210-a) of the latter. This means that multiple server-run computers can be arranged in a cluster, though the present invention includes two server-run computers 200-a and 200-b arranged on the server side.

The present invention embodiment allows the components of the client-run computer 100 to be also put available on the server-run computer 200-a or 200-b. This means that an object invoked on the client-run computer 100 can be used as the user program 110 to invoke another object.

Figure 2:
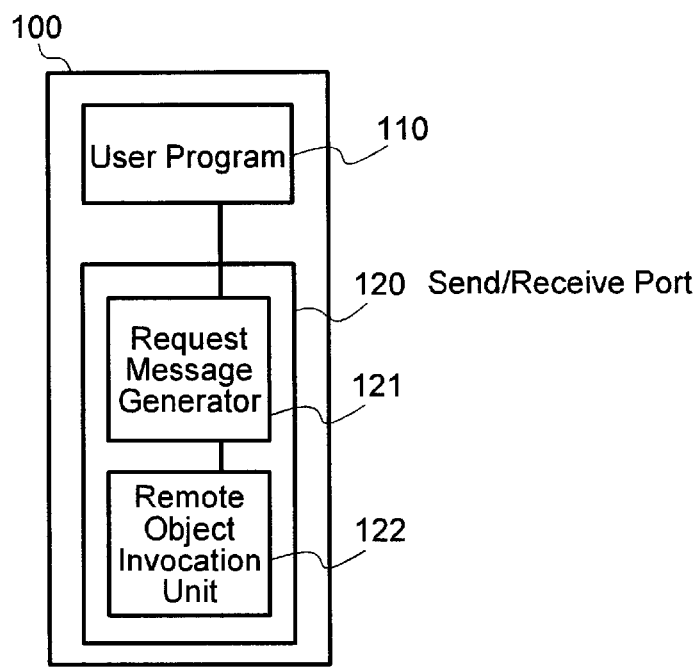
FIG. 2 is a block diagram showing the configuration of a server-run computer.

FIG. 2 shows in detail how the client-run computer 100 is configured with entities as constituents of the present embodiment of the invention.

The remote object invocation unit 120 consists of a request message generator 121 and a send/receive port 122. The request message generator 121 generates a request message 700 for remote object invocation with a method name specified, supplied from the user program 110. The send/receive port 122 sends the request message 700 to the server-run computer 200-a or 200-b and receives the result of method execution from the object invocation unit 220-a or 220-b on the server-run computer 200-a or 200-b.

Figure 3:
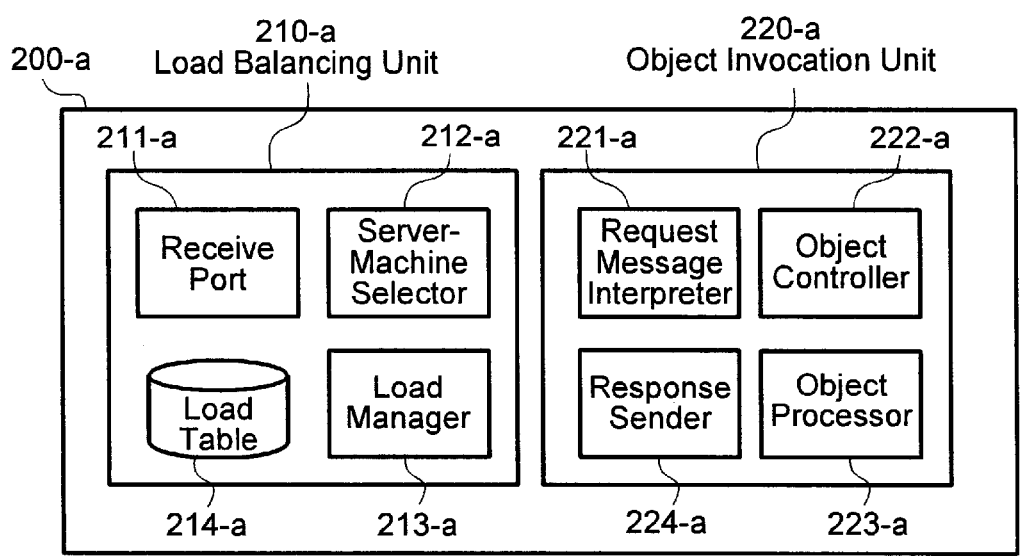
FIG. 3 is a block diagram showing the configuration of a server-run computer.

FIG. 3 shows in detail how the server-run computer 200-a is configured with entities as constituents of the present embodiment of the invention.

The load balancing unit 210-a consists of a receive port 211-a, a server-machine selector 212-a, a load manager 213-a, and a load table 214-a.

The receive port 211-a receives a request message 700 for remote object invocation. The server-machine selector 212-a receives the request message 700 from the receive port 211-a and selects a server-run computer that performs the task of execution of the requested method of the object, based on load information that is under the management of the load manager 213-a. If the server-machine selector 212-a selects its local server-run computer 200-a, then, it transfers the request message 700 to the object invocation unit 220-a on the local server-run computer 200-a. If the server-machine selector 212-a selects another server-run computer 200-b, then, it transfers the request message 700 to the object invocation unit 220-b on another server-run computer 200-b.

The load manager 213-a sends the load information on its local server-run computer 200-a to the load manager on another server-run computer. The load manager 213-a also receives load information on another server-run computer 200-b from the load manager thereon and saves this information in the load table 214-a.

The load table 214-a is a table wherein the load information on the server-run computer 200-a and other server-machines is stored.

The object invocation unit 220-a consists of a request message interpreter 221-a, an object controller 222-a, an object processor 223-a, and a response sender 224-a.

The request message interpreter 221-a receives the request message from the load balancing unit 210-a on its local server-run computer 200-a or the load balancing unit 210-b on another server-run computer 200-b, derives an object code identifier 710, an object data identifier 720, a method name 730, and user data 750 from the request message 700, and transfers them to the object controller 222-a. The object controller 222-a transfers the object code identifier 710, the objet data identifier 720, and the method name 730 to the object access unit 310 on the managing computer 300 and obtains object code and object data. After the object processor 223-a executes the method of the object, the object controller 222-a also transfers the object data identifier 720, the object data fixed after the method execution, and the method name 730 to the object access unit 310 on the managing computer 300.

The object processor 223-a receives the object code, object data, method name, and user data from the object controller 222-a and executes the method of the object. Moreover, the object processor 223-a returns the object data fixed after the method execution to the object controller 222-a.

The response sender 224-a receives the result of method execution from the object processor 223-a and transfers it to the remote object invocation unit 120 on the client-run computer 100.

Figure 4:
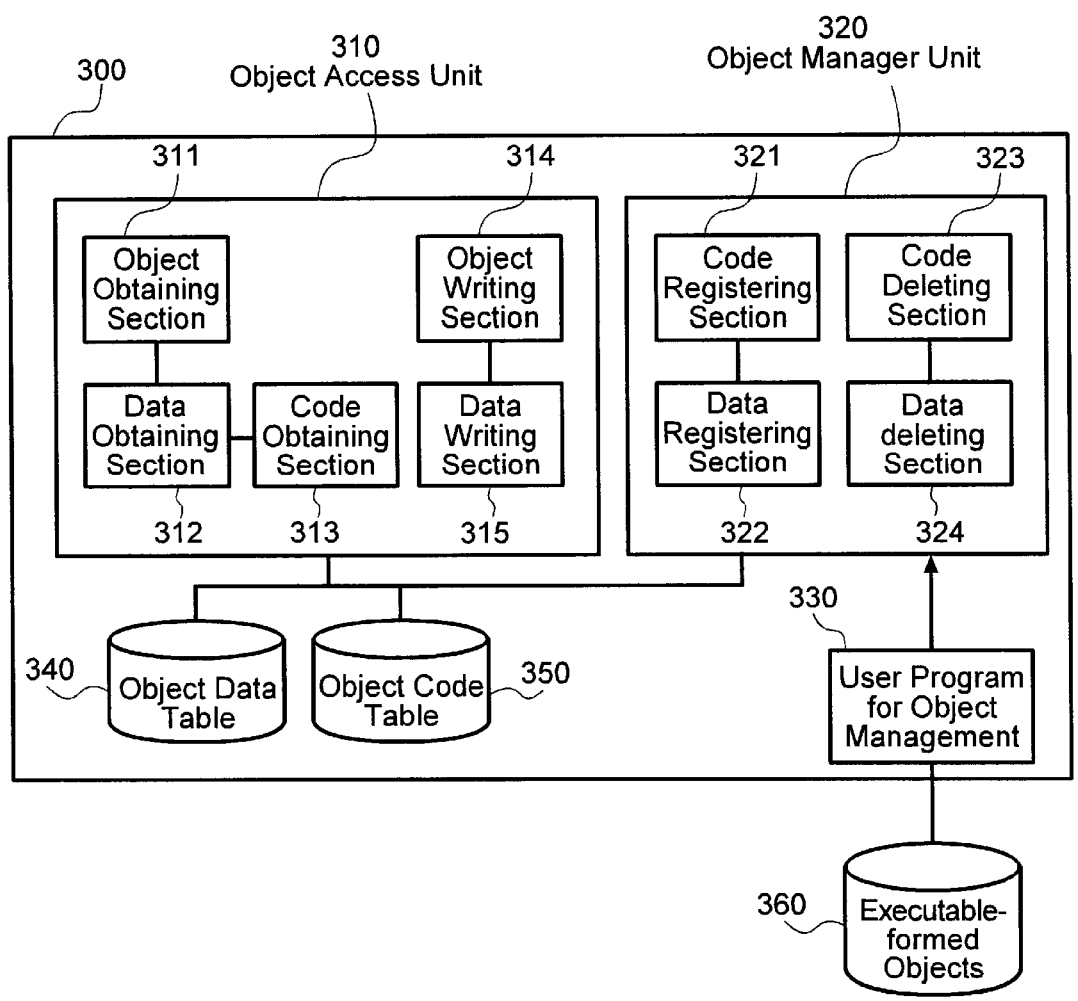
FIG. 4 is a block diagram showing the configuration of a managing computer.

FIG. 4 shows in detail how the managing computer 300 is configured with entities as constituents of the present embodiment of the invention.

The object access unit 310 consists of an object obtaining section 311, a data obtaining section 312, a code obtaining section 313, an object writing section 314, and a data writing section 315. The object obtaining section 311 receives the object code identifier 710, object data identifier 720, and method name 730 from the object invocation unit 220-a on the server-run computer 200-a. The code obtaining section 313 obtains the identified object code from the object code table 350. The data obtaining section 312 obtains the identified object data from the object data table 340. Then, the object obtaining section 311 transfers the object code and the object data to the object invocation unit 220-a on the server-run computer 200-a.

The object writing section 314 receives the object data identifier, the object data fixed after the method execution, and the method name from the object invocation unit 220-a on the server-run computer 200-a. The data writing section 315 saves the object data fixed after the method execution in the object data table 340.

The object manager unit 320 consists of a code registering section 321, a data registering section 322, a code deleting section 323, and data deleting section 324. After the retrieval of a specific object from the database of executable-formed objects 360, the code registering section 321 registers its object code into the object code table 350. The data registering section 322 registers its object data into the object data table 340. The code deleting section 323 deletes its object code from the object code table 350. The data deleting section 324 deletes its object data from the object data table 340.

FIG. 5 shows the data structure of the executable-formed objects in the present embodiment of the invention.

An executable-formed object 360 (its data structure is denoted by reference number 500) is composed of control information 510, object code 520, and object data 530. The control information 510 part includes an object code identifier 511 to identify the object code itself. This object code identifier 511 indicates the type of the object; objects with a same object code identifier are those of the same type, having the same object code. Object code 520 is aggregation of the program codes of all methods that the object has. An object is capable of having a plurality of methods. Executing a method is executing the program code of the method that reads and/or writes object data 530.

Attribute A per method 522 in the object code 520 part is information that indicates whether the method is synchronized or non-synchronized for each method. Here, the synchronized method means that, while the synchronized method of the object is executed, other synchronized methods of the object including the synchronized method being executed cannot be executed. The non-synchronized method means that, while the non-synchronized method of the object is executed, other synchronized and non-synchronized methods of the object including the non-synchronized method being executed can be executed. Code per method 523 is the program code of each method.

Object data 530 is aggregation of all members data that the object has. The section of data per object member 532 contains the data for each member. An object is capable of having a plurality of members. During method execution, the object data 530 is read and overwritten by the code per method 523.

FIG. 6 shows the format of the request message 700 that is sent from the client-run computer 100 to the server-run computer 200-*a* or 200-*b*, just after the user program initiates a remote object invocation.

The request message 700 is composed of four fields. The object code identifier 710 indicates the type of the object to be invoked on the server-run computer 200-*a* or 200-*b*. The object data identifier 720 is used to identify the object to be invoked on the server-run computer 200-*a* or 200-*b*. The method name 730 indicates the name of the method to be executed on the server-run computer 200-*a* or 200-*b*. The user data 750 is the data such as user-specified arguments to the method and this data specified within the user program is passed to the object when the requested method of the object is executed.

FIG. 7 shows the table 350 for object code management, maintained in the managing computer 300.

The object code table 350 (its data structure is denoted by reference number 800) maps an object code identifier 810 to an object code 840. Number of objects 820 indicates the number of active objects having the same object code. Status 830 indicates whether the object code is available now. If the status 830 is "ON," the object code is available. If the status 830 is "OFF," the object code is unavailable. The object code table 800 is a list of the object codes of active objects, or in other words, a list of the object types that can be invoked on the server-run computer 200-*a* or 200-*b*.

FIG. 8 shows the table 340 for object data management, maintained in the managing computer 300.

The object data table 340 (its data structure is denoted by reference number 900) maps an object data identifier 910 to object data 940. The object data identifier 910 identifies an object having particular object data. The object code identifier 920 indicates the object code coupled with the object data. The object use flag 930 indicates whether the object is used now. The "In-Use" object use flag indicates that the object is invoked and read. The "Unused" object use flag indicates that the object is not invoked for read. The object data table 900 is a list of active objects, or in other words, a list of the objects that can be invoked on the server-run computer 200-*a* or 200-*b*.

As the client-run computer 100 executes a remote object invocation by issuing a request message 700 in which a method name 730 is specified, the requirement for the server-run computer 200-*a* or 200-*b* to execute the method by invoking the object is that the object is active on the managing server 300. When the object is active on the managing computer 300, it is identified by the object data identifier 910 with its object data 940, its object code identifier 920 (or 810), and the associated object code 840. Same objects may exist that are of same type and assigned a same object data identifier 910. (Same-type objects are those assigned a same code identifier and of same data structure.)

If a plurality of requests for remote invocation of a same object for which the execution of a synchronized method is requested are simultaneously issued from the client-run computers 100, the method is not executed at the same time, but it is sequentially executed (serialized) to meet the invocation requests. Serialized method execution should apply to a method that overwrites the data per member; it can keep the data per member consistent.

If a plurality of requests for remote invocation of a same object for which the execution of a non-synchronized method is requested are simultaneously issued from the client-run computers 100, the method execution takes place concurrently, not in the serialized manner. Concurrent method execution should apply to a method that simply reads the data per member; it can increase the efficiency of execution.

FIG. 9 shows the table for load information management, maintained in the server-run computer 200-*a* or 200-*b*. The load table 600 (or 214-*a*) maps a server-machine identifier 610 to load information 620. The server-machine identifier 610 is a unique identifier assigned to the server-run computer 200-*a* or 200-*b*. The load information 620 is load information for the identified server-run computer. The contents of load information are not definitely specified herein, but generally, a CPU utilization factor and a request message arrival factor that can be acquired easily may be used as this information.

Figure 10:
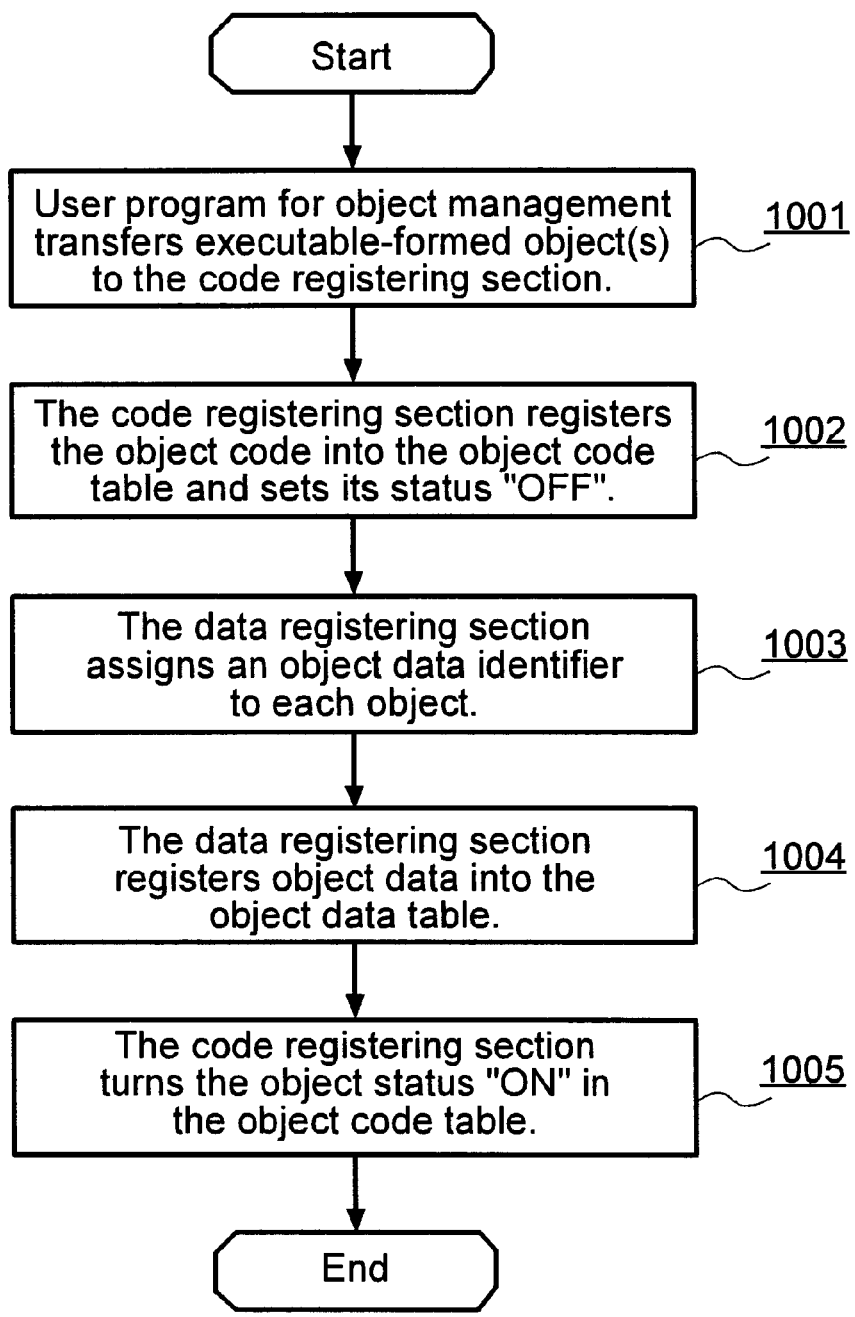
FIG. 10 is a flowchart illustrating the object activation process in a first preferred embodiment of the invention.

Then, the object activation process flow in the present invention embodiment will be explained blow with reference to FIG. 10.

When activating objects, activate the user program for object management 330 on the managing computer 300 and specify an executable-formed object 500 as the object to be activated and the number of objects as the input to the program. The user program for object management issues an object activation request with the above parameters to the code registering section 321 of the object manager unit 320 (1001). The code registering section 321 extracts the object code identifier 511 and object code 520 from the executable-formed object 500 and registers them into the object code table 800. The code registering section 321 also sets the number of objects 820 in the object code table 800 at the number of objects passed from the user program for object management and sets the status 830 "OFF" (1002). The data registering section 322 generates as many object data identifiers 910 as the number of objects (1003). The data registering section 322 extracts the object data 530 from the executable-formed object 500 and registers a triple of entries, object data identifier 910, object data 940, and object code identifier 810 into the object data table. At the same time, the object use flag is set "Unused" (1004). The code registering section 321 changes the status 830 of the object code identifier 810 to "ON" (1005).

At the managing computer 300, in this way, the user program for object management 330 can issue the object activation request with the number of objects 820 specified per object code identifier 810. Specifically, select an executable-formed object 500 that is an object represented as an executable program and specify the number of objects 820 and input them to the user program for object management 330, and the program commands the managing computer to activate the object. The program issues the object activation request with the user-input parameters to the object manager unit 320 on the managing computer 300. The object manager unit 320 activates the object consisting of the object code 520 and the object data 530 contained in the specified executable-formed object 500. Specifically, the object manager unit 320 reads the object code 520 and the object data 530 from the specified executable-formed object 500 and registers them into the object code table 800 and the object data table 900, respectively. The object code 520 and the object data 530 contained in the executable-formed object 500 exist in the object code table 800 and the object data table 900 respectively and this state, once set, is that the object is active. If there exists an active object or objects with the same object code identifier as the object code identifier 511 of the specified executable-formed object 500 when the user program for object management 330 issues the object activation request to the object manager unit 320, the object manager unit 320 additionally activates same-type objects so that as many objects as the specified number of objects 820 will be active.

Figure 11:
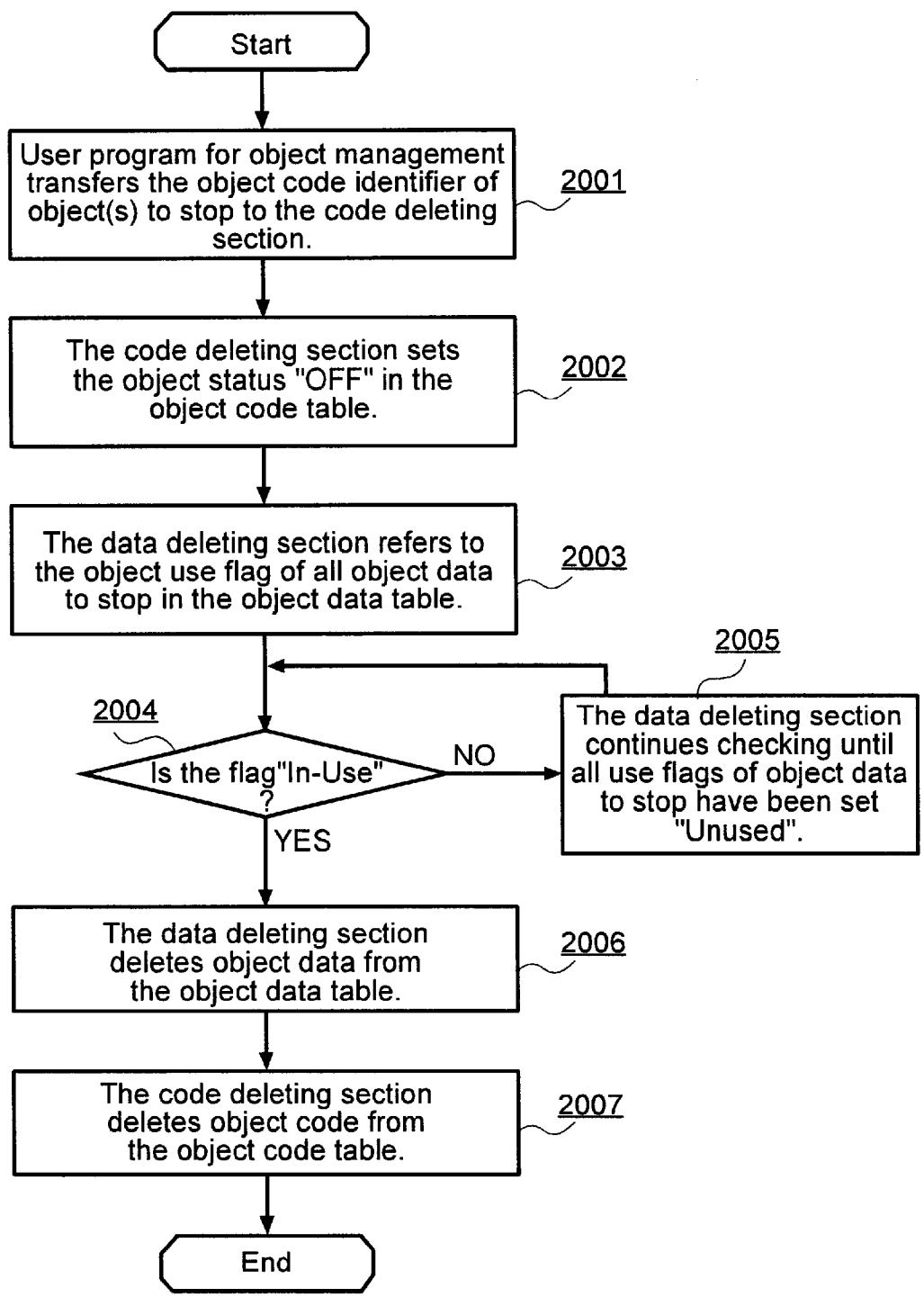
FIG. 11 is a flowchart illustrating the object deactivation process in the first embodiment.

Next, the object deactivation process flow in the present invention embodiment will be explained blow with reference to FIG. 11.

When deactivating objects, activate the user program for object management 330 on the managing computer 300 and specify the object code identifier 810 of an object that you want to deactivate as the input to the program. The program for object management 330 issues an object deactivation request with the above parameter to the code deleting section 323 of the object manager unit 320 (2001). The code deleting section 323 changes the status 830 of the object identified by the specified object code identifier in the object code table to "OFF" (2002). The data deleting section 324 deletes all object data in connection with the specified object code identifier from the object data table 900 (2006). The code deleting section 323 deletes the specified object code from the object code table 800 (2007).

At the managing computer 300, in this way, the user program for object management 330 can issue the object deactivation request per object code identifier 810. Specifically, specify the object code identifier 810 of an object that you want to deactivate and input it to the user program for object management 330, and the program commands the managing computer to deactivate the object. The program issues the object deactivation request with the user-input parameter to the object manager unit 320. The object manager unit 320 deactivates the object with the specified object code identifier 810. Specifically, the object manager unit 320 deletes the object code 840 identical to the specified object code identifier 810 from the object code table 800 and the object data 940 in connection with the object code from the object data table 900. The object code 520 and the object data 530 contained in the executable-formed object 500 are thus deleted from the object code table 800 and the object data table 900 respectively and this state, once set, is that the object is inactive. If both an object code identifier 810 and an object data identifier 910 are specified when the user program for object management 330 issues the object deactivation request to the object manager unit 320, the object manager unit 320 deactivates only the object with the object data identifier 910.

Figure 12:
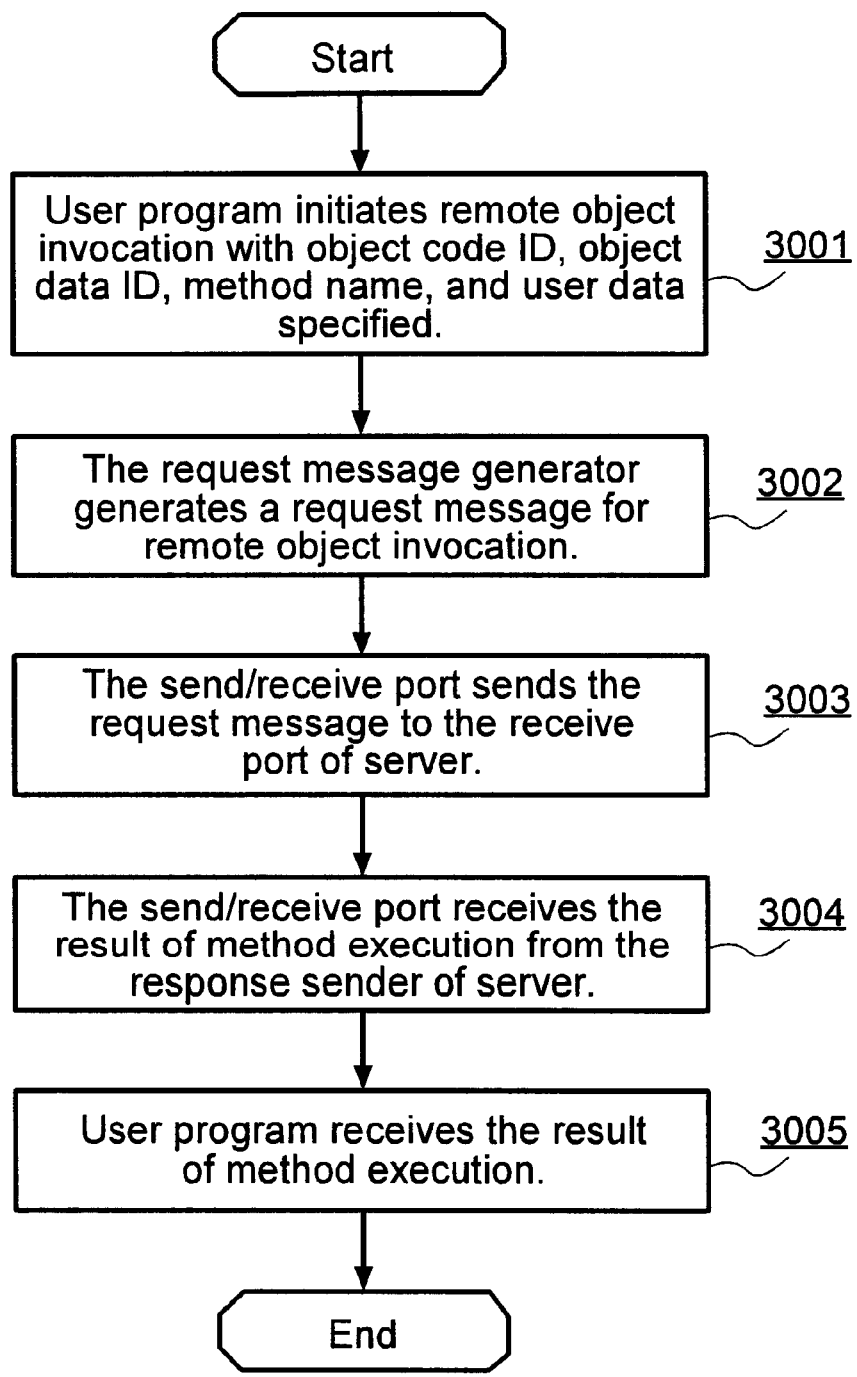
FIG. 12 is a flowchart illustrating remote object invocation implemented in the first embodiment.

Then, the remote object invocation process flow on the client-run computer 100 in the present invention embodiment will be explained blow with reference to FIG. 12.

First, activate the user program 110 on the client-run computer 100 and specify the object code identifier and object data identifier of an object to invoke, the name of a method to execute, and user data (may be blank) as the input to the program. The user program 110 requests the request message generator 121 of the remote object invocation unit 120 to generate a request message for remote object invocation with the above parameters (3001). How to obtain the object code identifier, object data identifier, and method name is not definitely specified herein. The simplest method of obtaining the object data identifier is to retrieve it from the object data table 900. The request message generator 121 generates a request message 700 with the object code identifier, object data identifier, method name, and user data parameters passed from the user program 110 and transfers the message to the send/receive port 122 (3002). The send/receive port 122 sends the request message 700 to the receive port 211-*a* of the server-run computer 200-*a* or the receive port of the server-run computer 200-*b*. How to determine what receive port to which the message is sent is not definitely specified herein. The simplest port selection method is to use a naming service of a Domain Name Service (DNS). Another possible method is invoking a program for management of receiving-end ports (destinations) that allocates a destination port and supplies it to the client program on the client-run computer 100.

The send/receive port 122 of the remote object invocation unit 120 on the client-run computer 100 receives the result of method execution from the response sender 224-*a* on the server-run computer 200-*a* or the response sender on the server-run computer 200-*b* (3004). The user program 110 receives the result of method execution from the send/receive port (3005). At the client-run computer 100, in this way, the user program 110 can request a remote object invocation with the method name specified of the remote object invocation unit 120. The remote object invocation unit 120 generates a request message 700 for the remote object invocation and sends it to the load balancing unit 210-*a* or 210-*b* on the server-run computer 200-*a* or 200-*b*, and thereafter receives the result of the method execution.

Now, the object invocation (method execution) process flow on the server-run computer 200-*a* in the present invention embodiment will be explained with reference to FIGS. 13 and 14.

The receive port 211-*a* of the load balancing unit 210-*a* on the server-run computer 200-*a* receives the request message 700 and transfers it to the server-machine selector 212-*a* (4001). The server-machine selector 212-*a* obtains load information from the load manager 213-*a*, and based on this information, selects a server-run computer to perform the task of object invocation and method execution in response to the request message 700 just received (4002).

A method in which the server-machine selector 212-*a* of the load balancing unit 210-*a* selects a server-run computer, based on the load information is not definitely specified herein. If the load information is, for example, a CPU utilization factor, selecting a server-run computer is generally based on round robin scheduling; whereas, such a method may be used that, if the CPU utilization factor of a server-run computer reaches a specific value, another server-run computer with a lower CPU utilization factor is a priority of selection. A method in which the load manager 213-*a* manages load information is not definitely specified herein. If the load information is, for example, a CPU utilization factor, the following method is possible. The load manager 213-*a* or 213-*b* periodically measures the CPU utilization factor of its local server-run computer and retains it. The load manager 213-*a* periodically receives from another server-run computer 200-*b* the CPU utilization factor information obtained there and reflects this information in the load table 214-*a*.

In the next step (4003), judgment is made as to whether the selected machine is its local sever-run computer. If the local server-run computer 200-*a* is selected, the server-machine selector 212-*a* transfers the request message 700 to the request message interpreter 221-*a* of the object invocation unit 220-*a* (4004). If another server-run machine 200-*b* is selected, the selector 212-*a* transfers the request message 700 to the corresponding request message interpreter on the server-run computer 200-*b* (4005). The request message interpreter 221-*a* receives the request message 700 from the server-machine selector 212-*a* on its local server-run machine 200-*a* or the corresponding server-machine selector on another server-run computer 200-*b*. From the request message 700, the interpreter derives the object code identifier 710, object data identifier 720, method name 730, and user data 750 and transfers them to the object controller 222-*a* (4006).

The object controller 222-*a* on the server-run computer 200-*a* transfers the object code identifier 710, object data identifier 720, and method name 730 to the object obtaining section 311 on the managing computer 300 (4007). The object controller 222-*a* receives object code 840 and object data 940 from the object obtaining section 311 and transfers them together with the information derived from the request message 700 to the object processor 223-*a* (4008).

The object processor 223-*a* on the server-run computer 200-*a* executes the requested method by using the object code 840 and the object data 940 passed from the object controller (4009). The object controller 222-*a* receives the object data fixed after the method execution from the object processor 223-*a*. Then, the controller transfers the object data identifier, the object data fixed after the method execution (object invocation), and the method name to the object writing section 314 on the managing computer 300 (4010).

The response sender 224-*a* on the server-run computer 200-*a* receives the result of the method execution from the object processor 223-*a* and sends it to the send/receive port 122 on the client-run computer 100 (4011).

As described of the above steps 4001 through 4011, the server-run computer 200-*a* operates as follows. The load balancing unit 210-*a* receives the request message 700 and performs load balancing. From the object access unit 310 on the managing computer 300, the object invocation unit 220-*a* obtains the object data 530 and object code 520 of the object identified by the object code identifier 710 and object data identifier 720 in the request message 700. The object invocation unit 220-*a* executes the specified method in the object code 520 part by using the object data 530. Specifically, the method in the object code 520 part computes while reading the members in the object data 530 part or writing data to them. Because the method in the object code 520 part may write object data 530, the object access unit 310 is requested to overwrite the object data 530.

Figure 15:
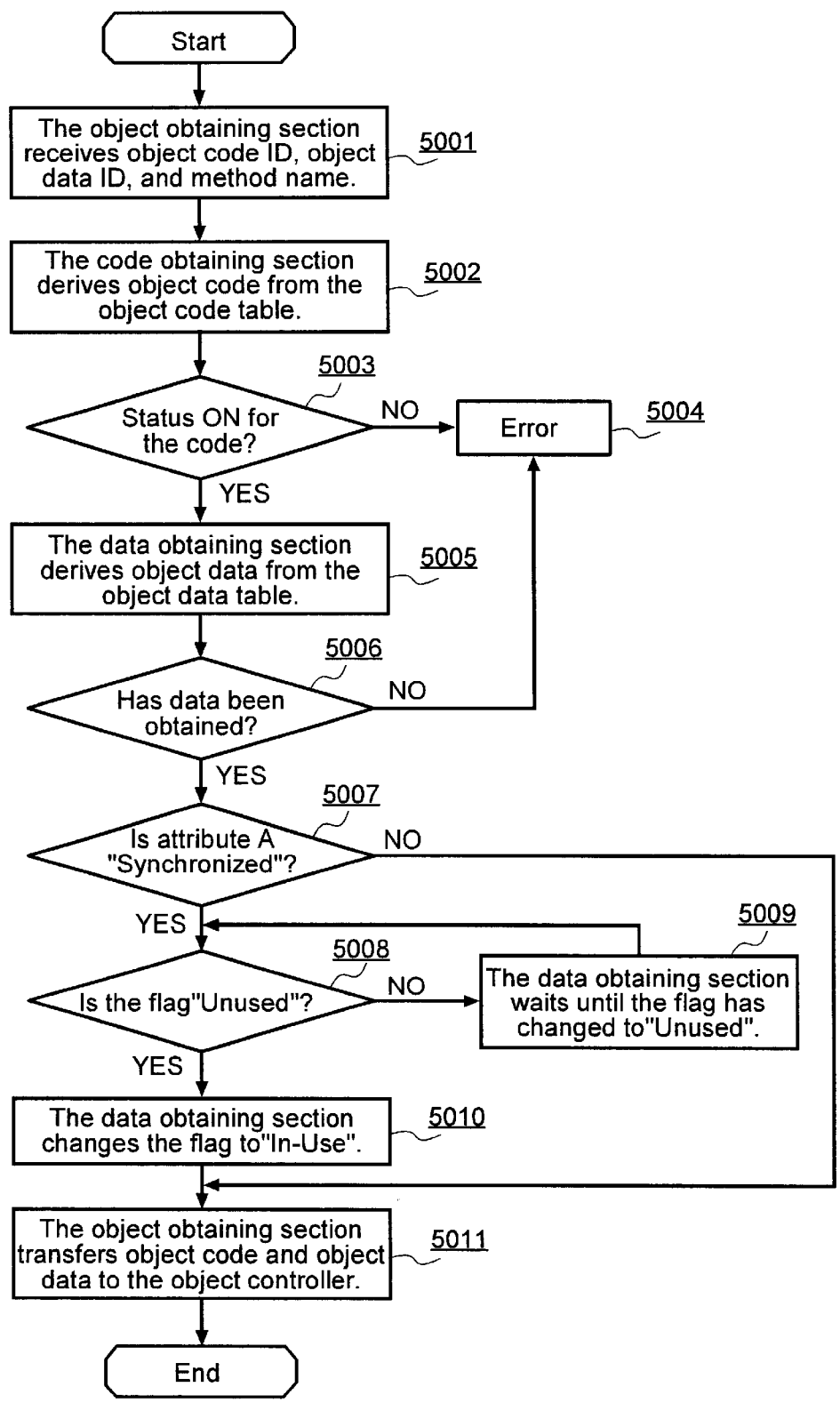
FIG. 15 is a flowchart illustrating the object obtaining process in the first embodiment.

The object obtaining process flow on the managing computer 300 in the present invention embodiment will be explained below with reference to FIG. 15.

The object obtaining section 311 on the managing computer 300 receives the object code identifier 710, object data identifier 720, and method name 730 from the object controller 222-*a* on the server-run computer 200-*a* (5001). The code obtaining section 312 obtains the object code 840 identified by the object code identifier 710 and its status 830 from the object code table 800 (5002). Judgment is made to whether the object code 840 has been obtained successfully and its status 830 is "ON" (5003). If this is judged untrue, it is an error indicating that the object is not active (5004). The data obtaining section 313 obtains the object data 940 identified by the object data identifier 910 and its object use flag 930 from the object data table 900. Judgment is made as to whether the object data has been obtained successfully (5006). If this is judged untrue, it is an error indicating the object is not active (5004). The data obtaining section 313 judges whether the attribute A 522 of the specified method is "Synchronized" (5007).

If the attribute A 522 is "Synchronized," further judgment is made as to whether the object use flag 930 of the object data identifier 910 is "Unused" (5008). If the flag 930 is "In-Use," the data obtaining section 313 enters the wait state, waiting until the flag has changed to "Unused" (5009). If the flag 930 is "Unused," the data obtaining section 313 changes the flag 830 to "In-Use" (5010). The object obtaining section 311 transfers the obtained object code and data to the object controller 222-*a* on the server-run computer 200-*a* (5011). The object obtaining section does so even if the attribute A 522 of the method is "Non-synchronized" (5011).

At the managing computer 300, In this way, the object access unit 310 receives the request to obtain the object data 940 and object code 840 from the object invocation unit 220-*a* on the server-run computer 200-*a*, obtains them from the object code table 800 and the object data table 900, and transfers them to the object invocation unit 220-*a*. If, however, the above request is intended for synchronized method execution, the object access unit 310 serializes the object data obtained from the object data table 900. As a result, if a plurality of remote object invocation requests for a synchronized method of a same object are issued from the client-run computers 100, the server-run computer 200-*a* or 200-*b* performs object invocation (method execution) in a serialized manner.

Figure 16:
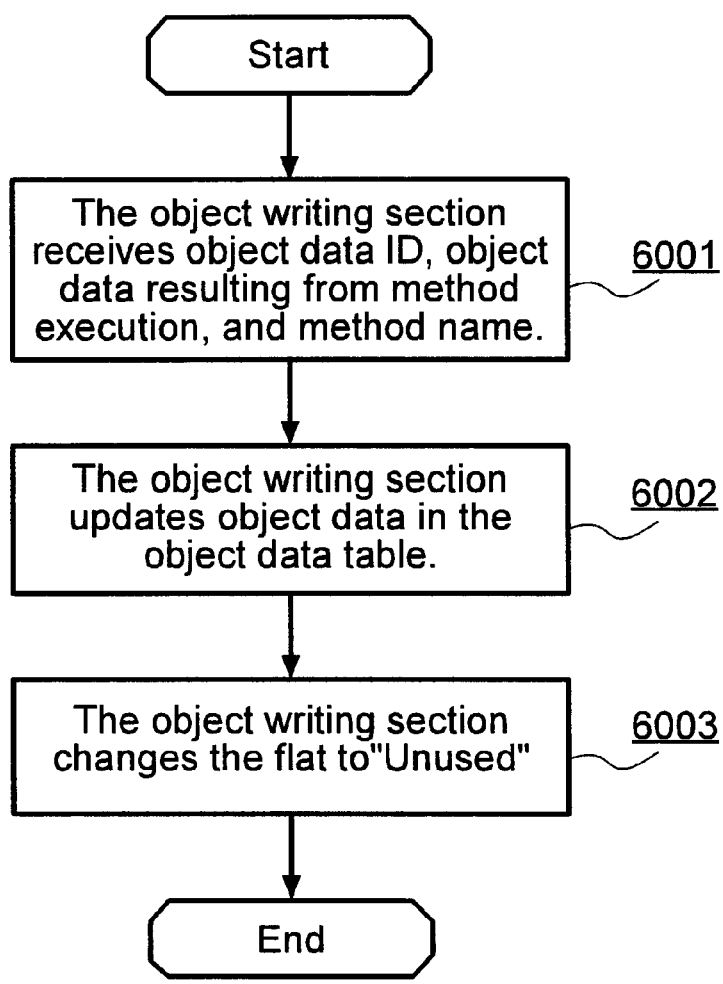
FIG. 16 is a flowchart illustrating the object overwrite process in the first embodiment.

The object overwrite process flow on the managing computer 300 in the present invention embodiment will be explained below with reference to FIG. 16.

The object writing section 314 receives the object data identifier 910, the object data 940 fixed after method execution, and the method name 730 (6001). The data writing section 315 writes the object data fixed after method execution over the object data 940 identified by the object data identifier 910 in the object data table 900 (6002). The object writing section 315 changes the object use flag 930 of the object data identifier 910 to "Unused" (6003). At the managing computer 300, in this way, the object access unit 310 receives the request to overwrite the object data 940 with the object data fixed after method execution from the object invocation unit 220-*a* and overwrites the specified data in the object data table 900.

Next, a second preferred embodiment of the invention will be described in detail, based on the drawings. FIGS. 1, 2, 3, and 4 also apply to the distributed object system model as the second embodiment of the invention to illustrate its overall and detailed configurations. FIGS. 6, 7, 8, and 9 also apply to the second embodiment to illustrate the data structure thereof. However, the structure of the executable-formed object 500 for the first embodiment is modified.

Figure 17:
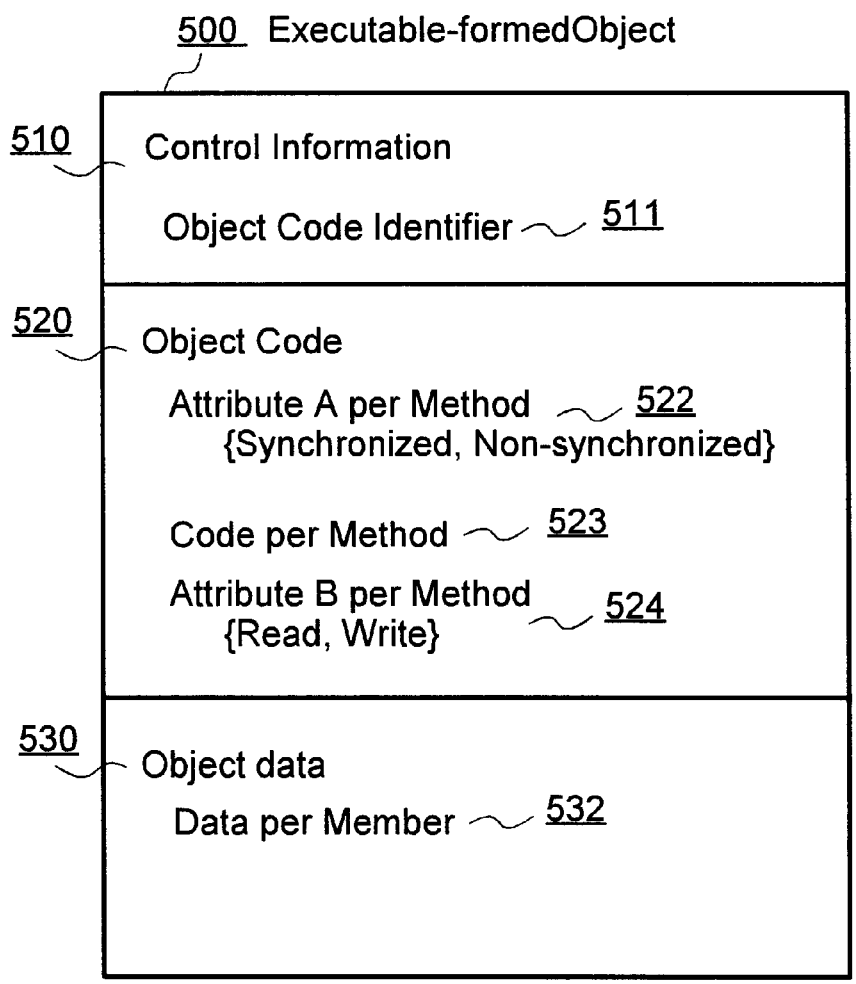
FIG. 17 shows the structure of an executable-formed object for use in a second preferred embodiment of the invention.

FIG. 17 shows the data structure of an executable-formed object in the second embodiment of the invention. Here, attribute B per method 524 is added to the executable-formed object 500 shown in FIG. 5. A "Read" attribute B 524 means that the object data does not change during the method execution. A "Write" attribute B 524 means that the object data is rewritten during the method execution.

Activating and deactivating objects and the action on the client-run computer 100 in the second embodiment are the same as those in the first embodiment.

Figure 13:
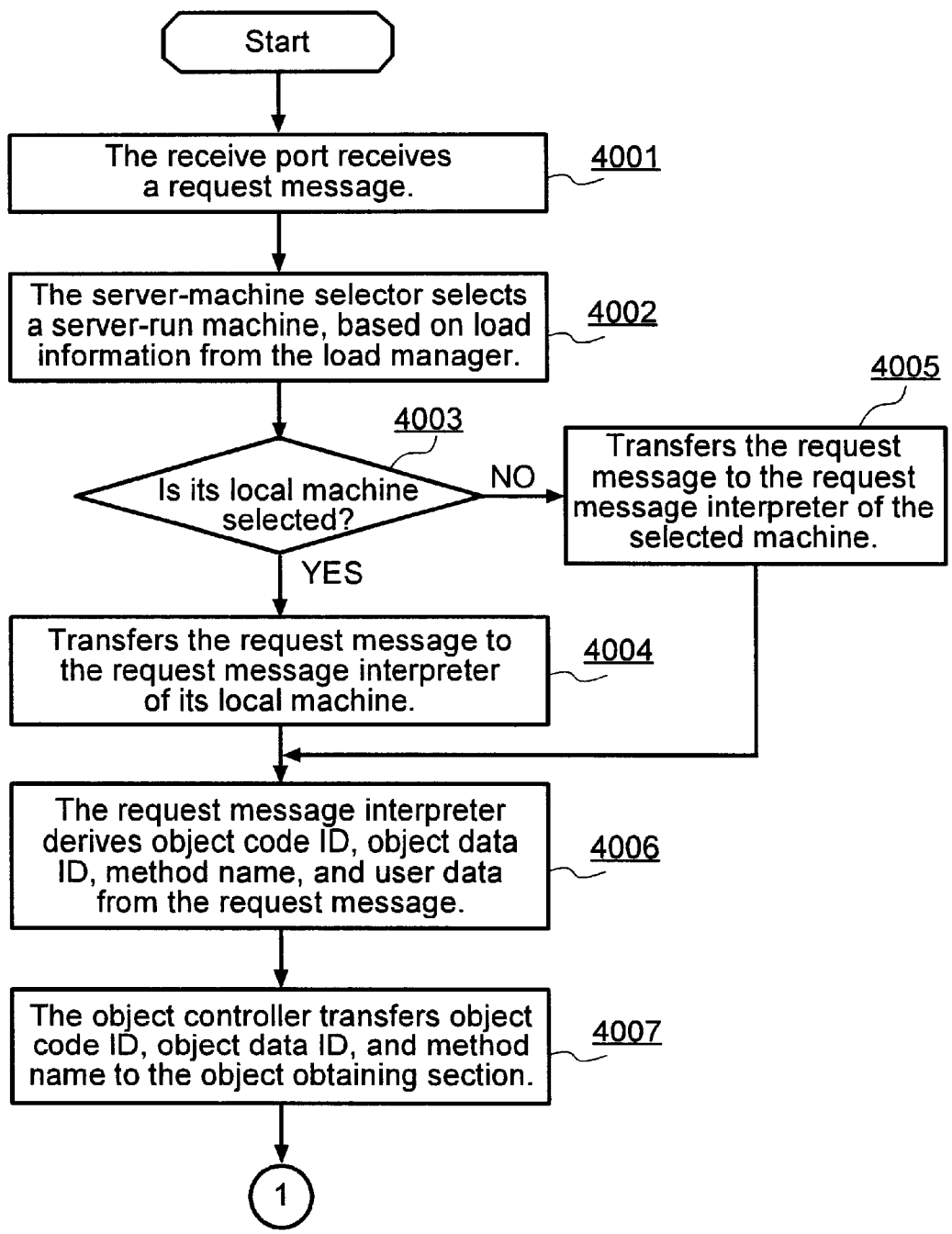
FIG. 13 is a flowchart illustrating object invocation implemented in the first embodiment.
Figure 14:
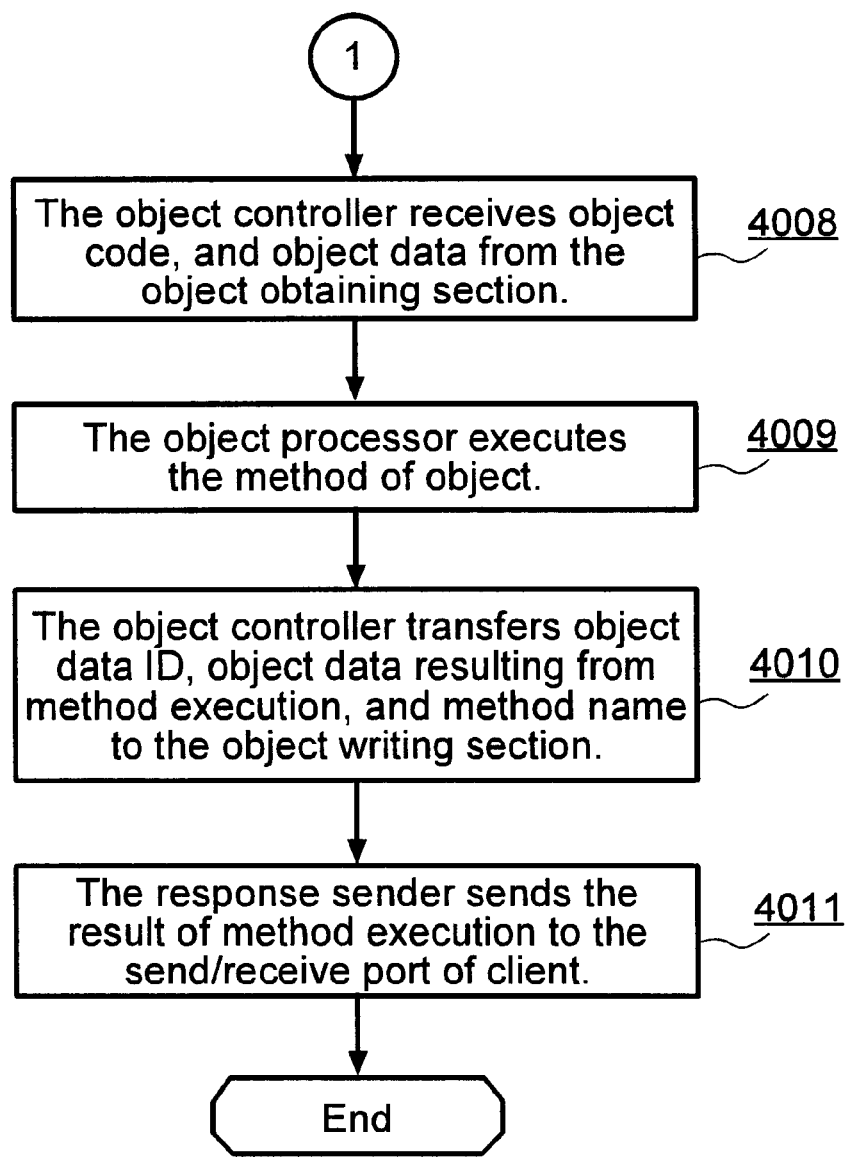
FIG. 14 is a flowchart illustrating object invocation implemented in the first embodiment, a continuation of FIG. 13.
Figure 18:
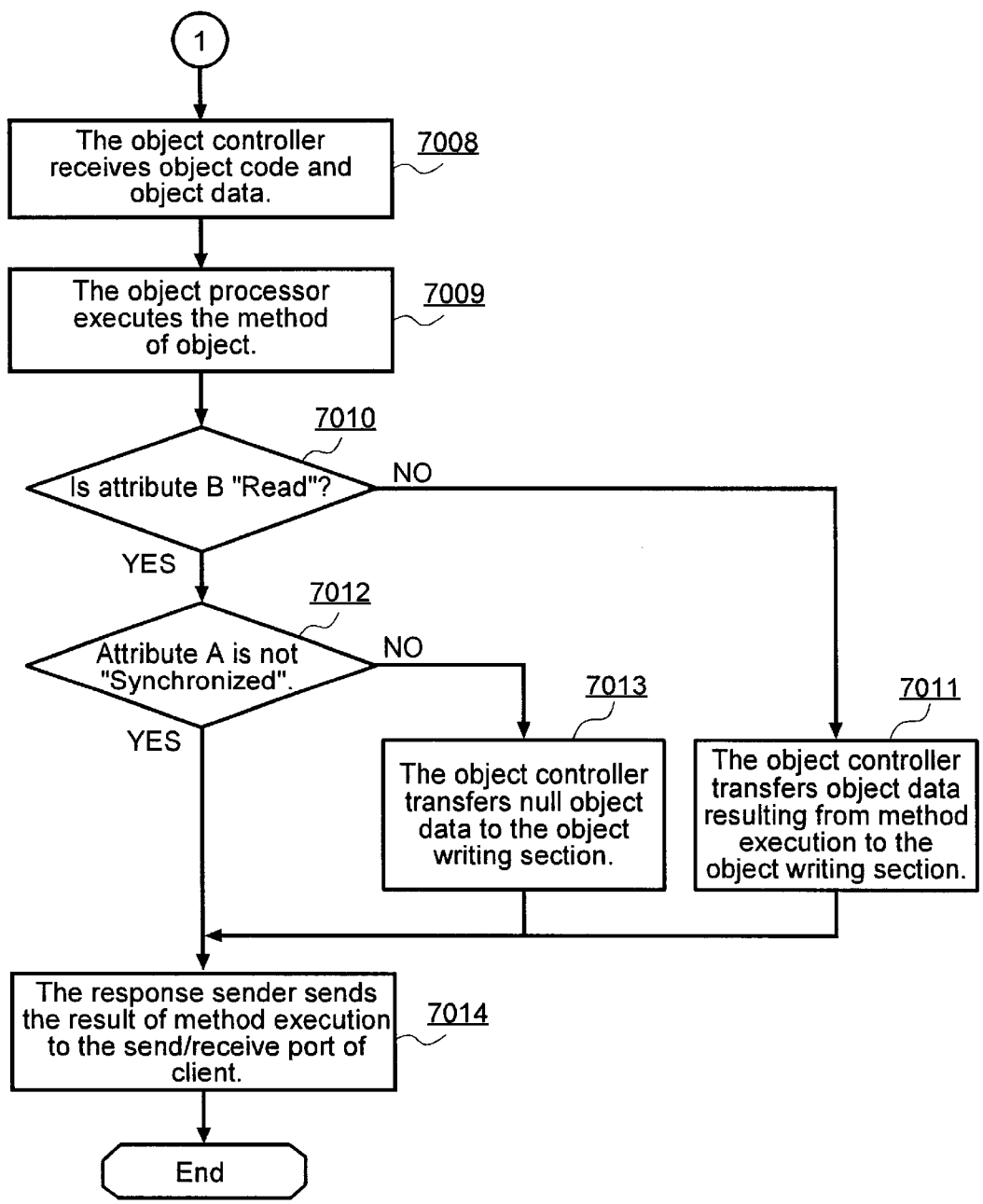
FIG. 18 is a flowchart illustrating object invocation implemented in the second embodiment.

The flow of action on the server-run computer 200-a in the second embodiment also follows the steps illustrated in FIG. 13 for the first embodiment before the step 4008. The subsequent flow of action on the server-run computer 200-a in the second embodiment will be explained below with reference to FIG. 18.

The object controller 222-a on the server-run computer 200-a receives the object code 520 and object data 530 from the object obtaining section 311 and transfers them together with the information derived from the request message 700 to the object processor 223-a (7008). The object processor 223-a executes the requested method by using the received object code 520 and object data 530 (7009). The object controller 222-a receives the object data fixed after the method execution. Then, the object controller derives the attribute A 522 and attribute B 524 of the method name from the object code 520 and first judges whether the attribute B 524 is "Read" (7010). If the attribute B 524 is "Write," the object controller transfers the object data identifier 910, the object data 940 fixed after the method execution, and the method name 730 to the object writing section 314 on the managing computer 300 (7011). If the attribute B 524 is "Read," the object controller then checks that the attribute A 522 is not "Synchronized" (7012). If the attribute A is "Synchronized," the object controller transfers the object data identifier, null object data, and method name to the object writing section 314 (7013). The response sender 224-a on the server-run computer 200-a receives the result of the method execution from the object processor 223-a and sends it to the send/receive port 122 on the client-run computer 100 (7014).

The object obtaining process flow on the managing computer 300 in the second embodiment is the same as that in the first embodiment.

Figure 19:
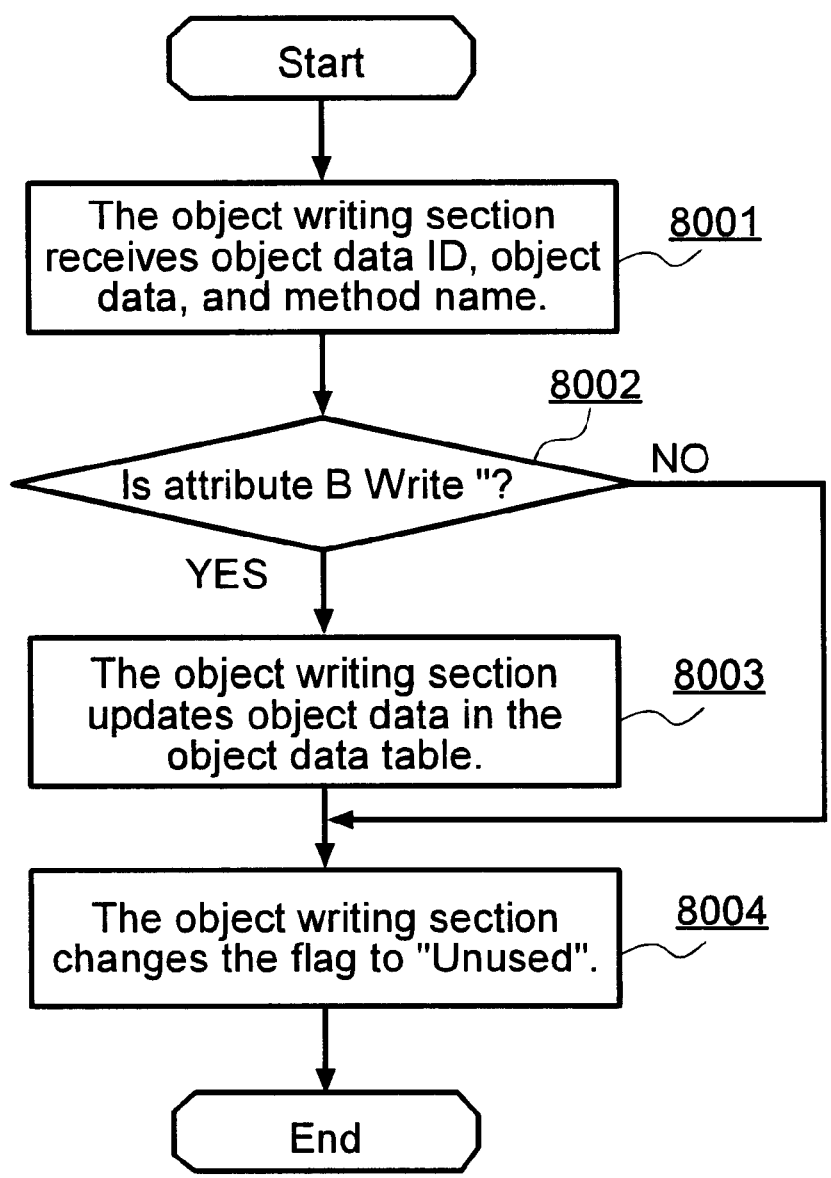
FIG. 19 is a flowchart illustrating the object overwrite process in the second embodiment.

The object overwrite process flow on the managing computer 300 in the second embodiment will be explained below with reference to FIG. 19.

The object writing section 314 on the managing computer 300 receives the object data identifier 910, object data 940, and method name 730 (8001). The data writing section 315 judges whether the attribute B 524 of the method name is "Write" (8002). If the attribute B 524 is "Write," the data writing section 315 overwrites the object data 940 identified by the object data identifier 910 with the object data fixed after the method execution in the object data table 900 (8003). The data writing section 315 changes the object use flag 930 of the object data identifier 910 to "Unused" (8004). This data writing section 315 does so even if the attribute B 524 is "Read" (8004).

In the second embodiment, if a method of Read and Synchronized attributes is executed on the sever-run computer 200-a, because the specified method in the object code part does not overwrite the members in the object data part, the object access unit 310 is not requested to overwrite the object data, but is requested to simply return the object use flag to "Unused" from "In-Use" that has been set when obtaining the object data. If a method of Read and Non-synchronized attributes is executed on the server-run computer 200-a, similarly, because the specified method in the object code part does not overwrite the members in the object data part, the object access unit 310 is not requested to overwrite the object data. In this case, the object use flag of the object data is not used, and therefore the object access unit is not requested to change the object use flag 930. As a result, by classifying methods into "Read" and "Write" by using the attribute B 524 per method, the cost of communication between the server-run computer 200-a and the managing computer 300 can be reduced.

System expansion to cope with rapid traffic increase in the first and second embodiments will be explained below.

If rapid increase of the access from the client-run computers 100 to the sever-run computer 200-a or 200-b occurs beyond the processing capacity of the server-run computers 200-a and 200-b, a new server-run computer must be added to the system. In this case, system expansion is possible by connecting a new server-run computer equipped with the load balancing unit and the object invocation unit to the network 10 and altering the system operation such that some of the request messages received at the load balancing unit 210-a or 220-b may be forwarded to the load balancing unit of the new server-run computer or some of the request messages received at the load balancing unit of the new server-run computer may be forwarded to the load balancing unit 210-a or 220-b. For conventional distributed object systems, it is necessary to install objects and activate them on a new server-run computer connected to the server cluster. By contrast, the work of installing and activating objects on the new server-run computer is not necessary in the similar system offered by the present invention. This is because objects are activated only on the managing computer 300 and when the new server-run computer receives a request for remote object invocation from the client-run computer 100, its object invocation unit obtains object code and objet data of the specified object from the object access unit 310 on the managing computer 300 and executes the requested method.

Furthermore, system service alteration to meet a service change request in the first and second embodiments will be explained below.

If the system in question is requested to alter its service, e.g., altering the service provided by an object by altering the method specification, it is necessary to replace the active object by a new object made to the altered specification. Such service alteration is possible by deactivating the object on the managing computer 300, replacing the object by a new object as the executable-formed object 360 made to the altered specification, and activating the new object. Conventional distributed object systems, comprising a plurality of server-run computers and clients, must cope with such service alteration as follows. The object to change is deactivated on each server-run computer, replaced by a new object as the executable-formed object made to the altered specification, and the new object is activated on each server-run computer. By contrast, the distributed object system offered by the present invention does not require a series of operations: deactivating the object to change on the server-run computers 200-*a* and 200-*b*; replacing it by a new object as the executable-formed object made to the altered specification; and activating the new object on the server-run computers 200-*a* and 200*b*. This is also because objects are always activated/deactivated on the managing computer 300 and when receiving a request for remote object invocation from the client-run computer 100, the object invocation unit 220-*a* or 220-*b* obtains object code and object data of the specified object from the object access unit 310 on the managing computer 300 and executes the requested method.

Then, an application example of the present invention will be explained below.

Now, a shopping system using WWW and distributed objects will be explained as an example of application with reference to the configuration drawing of the distributed object system model shown in FIG. 1.

The client-run computer 100 in this application example comprises a WWW browser and HTML-format files. The WWW browser corresponds to the remote object invocation unit 120 and the HTML-format files correspond to the user program 110. It is assumed that a specific object code identifier, object data identifier, method name, and arguments to method are embedded in each of the links in HTML-format file hypertexts. By selecting a link in the hypertext of an HTML-format file displayed on the WWW browser window, the user requests the system to return another HTML-format file as the result of accessing the system. This corresponds to the process that the user program 110 requests the remote object invocation unit 120 to issue a remote object invocation request with a method name specified to the server side and return the received result of the method execution.

The server-run computer 200-*a* or 200-*b* in the present application example comprises a WWW server and an object invocation unit 220-*a* or 220-*b*. In the application example, in addition, a router with a load balancing feature, which is not shown, is assumed placed between the client-run computer 100 and the server-run computer 200-*a* or 200-*b*. This router with a load balancing feature receives a request message 700 for returning an HTML-format file which contains result of method execution from the WW browser and forwards the request message 700 to the server-run computer 200-*a* or 200-*b*, according to the round robin scheduling or load condition. The combination of the WWW server and the router with a load balancing feature corresponds to the load balancing unit 210-*a* or 210-*b*. How the WWW server receives the request message and transfers it to the object invocation unit 220-*a* or 220-*b* is not definitely specified herein. A typical interface example between the WWW server and an external program is a Common Gateway Interface (CGI).

The managing computer 300 in the present application example comprises the object access unit 310, object manager unit 320, user program for object management 330, object data table 340, object code table 350, and executable-formed objects 360. There are two types of executable-formed objects: catalog object and cart object.

A catalog executable-formed object 360 has three methods: a list method (non-synchronized, read) that generates a list of commodities available in the shopping system; a start method (non-synchronized, read) that activates a cart object to be handled on the WWW browser; and an end method (non-synchronized, read) that deactivates a cart object.

Only one catalog object is activated in the shopping system. When the user selects a link in the HTML-format file hypertext shown on the WWW browser window, the linked method of the only catalog object is executed. The list method obtains commodity information such as commodity list from the database, marks up the information into an HTML-format file, and returns this file to the WWW browser as the result of method execution. The start method activates the user program for object management 330 for cart objects via the network and activates a cart object to be assigned to the WWW browser. Then, the start method embeds the object code identifier and object data identifier of the activated cart object into an HTML-format file and returns this file to the WWW browser as the result of method execution. The end method receives the object code identifier and object data identifier of a cart object assigned to the WWW browser as the arguments thereto, activates the user program for object management 330 for cart objects, and deactivates the cart object.

A cart executable-formed object 260 has two methods: a put method (synchronized, write) that adds an commodity identifier that is supplied as an argument thereto to a member of the cart object; and a buy method (synchronized, write) that determines buying a commodity or commodities identified by the commodity identifier(s) held in the cart object. The cart object also has the member to contain strings of commodity identifiers. When the cart object is activated, this member contains no commodity identifier.

When the start method for s cart object is executed, the cart object is activated and assigned to the WWW browser. When the end method of the catalog object is executed, the cart object assigned to the WWW browser is deactivated. When the user selects a link in the HTML-format file hypertext shown on the WWW browser window, the linked method of the cart object assigned to the WWW browser is executed. The put method receives a commodity identifier as the argument thereto and saves it into the member for holding the commodity identifier. The buy method adds the strings of the commodity identifiers saved in the member to the database and saves the commodity information determined to be bought.

There are two types of user programs for object management 330: the program for catalog objects and the program for cart objects.

The user program for object management 330 for catalog objects is executed when starting the shopping system itself and activates one catalog object. This program is also executed when terminating the shopping system and deactivates the catalog object.

The user program for object management 330 for cart objects is activated and executed via the network 10, following the execution of the start method of the catalog object on the server-run computer 200-*a* or 200-*b* triggered by a request message from the WWW browser. This program activates a cart object to be handled on the WWW browser in addition to the active catalog object. This program is also activated and executed via the network, following the execution of the end method of the catalog object on the server-run computer 200-*a* or 200-*b* triggered by a request message from the WWW browser 700. This method deactivates the cart object to be handled on the WWW browser.

When the shopping system starts up, the object code of the catalog object and the object code of the cart object are registered into the object code table 350. At the same time, one object data set of the catalog object and as many object data sets of the catalog object as the number of WWW browsers that are running for shopping, each data set corresponding to each WWW browser run for shopping, are registered into the object data table 340.

In the present application example, a computer for commodity database, which is not shown, is assumed connected to the network 100. On this computer for commodity database, an area is allocated in which commodity information such as lists of commodities available by using the shopping system has been stored and another area is allocated into which information for a commodity bought by the user is stored when the user determines to buy the commodity. In the architecture of the shopping system, the computer for commodity database is to be used by the catalog object and the cart object. Specifically, the list method of the catalog object retrieves commodity information such as a list of commodities from the database on the computer for commodity database. The buy method of the cart object adds the information for a commodity determined to be bought to the database on the computer for commodity database.

A request message is sent from a WWW browser to a WWW server by selecting one of the links in the HTML-format file hypertexts shown on the WWW browser window. In response to the request message, the program code of the requested method of the specified object is executed. The result of the method execution is marked up into an HTML-format file that is sent back to the WWW browser as the response. This process corresponds to the process from remote object invocation that is initiated by the user program 110, method execution, that is, the program code of the requested method of the specified object is executed, until the result of the method execution is returned to the user program 110.

Next, the relation between the links in HTML-format file hypertexts and the methods of the catalog or cart object will be explained below. Assume that an HTML-format file hypertext including the links to the methods of the catalog or cart object is shown on the window of the WWW browser active on the client-run computer 100. When the user selects one of the links, the linked method is executed on the server-run computer 200-*a* or 200-*b*. The program code of the selected method is executed and the result of execution is marked up into an HTML-format file that is sent back as the response. The WWW browser displays the text of the HTML-format file received as the response. In the present application example, how transition from one HTML-format file hypertext to another HTML-format file hypertext occurs by selecting a link and how the links are organized in each HTML-format file hypertext are not definitely specified herein. A simple example case will be explained below. A first HTML-format file hypertext is assumed to include a link to the list method. When the user selects the link to the list method, a commodity list is shown and the transition to a second HTML-format file hypertext that includes a link to the start method occurs. By selecting the link to the start method in the second HTML-format file hypertext, the transition occurs to a third HTML-format file hypertext that includes a put method link or form that allows the user to specify a commodity identifier as well as a link to the buy method. By selecting the put method link, the transition to another item occurs within the same third HTML-format file hypertext, so that the user can repeatedly select the put method link until the buy method link has been selected in the third HTML-format file hypertext. By selecting the buy method link, the transition occurs to a fourth HTML-format file hypertext including a message that notifies the user that purchase has been fixed as well as a link to the end method. By selecting the end method link in the fourth HTML-format file hypertext, the transition to the first HTML-format file hypertext occurs.

Then, how the shopping system starts and terminates in the present application example will be explained below. To start the shopping system the user program for object management 330 for catalog objects is executed on the managing computer 300. The user program for object management 330 for catalog objects requests the object manager unit 320 to activate one catalog object. The object manager unit 320 retrieves a catalog object from the database of executable-form objects 360 and registers its object code and object data into the object code table 350 and the object data table 340 respectively, thus activating the catalog object. To terminate the shopping system, the user program for object management 330 for catalog objects is executed as is for starting the shopping system and issues a request to deactivate the catalog object.

Next, browsing a commodity list on the WWW browser window, that is, executing the list method of the catalog object by request from the WWW browser will be explained below. It is assumed that an HTML-format file hypertext including a link in which the object code identifier and object data identifier of the catalog object and the list method name are embedded is shown on the WWW browser window. When the user selects the above link, a request message containing the above information such as the object code identifier is sent from the WWW browser to the router with a load balancing feature, not shown. Upon the reception of this request message, the router with a load balancing feature sends the request message to the server-run computer 200-*a* or 200-*b*, according to the round robin scheduling or load condition. Assume that the router selects the server-run computer 200-*a* as the destination.

The WWW server on the server-run computer 200-*a* receives the request message and transfers it to the object invocation unit 220-*a*. The object invocation unit 220-*a* obtains the catalog object from the object access unit 310 on the managing computer 300 and executes the list method. The list method retrieves commodity information such as a list of commodities from the commodity database and marks up the information into an HTML-format file that is sent back to the WWW browser on the client-run computer 100 as the response. At this time, the access unit 310 on the managing computer 300 is not requested to overwrite the object data after method execution, because the list method is a method of non-synchronized and read attributes. If a plurality of WWW browsers simultaneously issue the requests to execute the list method, the list method execution takes place concurrently on a plurality of server-run computers without being serialized, because the list method is a method of non-synchronized and read attributes.

Next, starting and terminating shopping on the WWW browser window, that is, executing the start method and the end method of the catalog object by request from the WWW browser will be explained below. As is the case for browsing a commodity list on the WWW browser window, the start method of the catalog object is executed by request from the WWW browser. The start method activates the user program for object management 330 for cart objects, accessing the managing computer 300 via the network 10. The user program for object management 330 for cart objects requests the object manger unit 320 to additionally activate a cart object. The object manager unit 320 retrieves a cart object from the database of executable-formed objects 360 and additionally activates the cart object. The start method obtains the object data identifier of the activated cart object via the network 10 and generates an HTML-format file containing a hypertext in which the cart object code identifier, the object data identifier of the activated cart object, and the put and buy method names are embedded. The HTML format file is sent back to the WWW browser as the response. The activated cart object is to be handled by the WWW browser. To terminate shopping, the end method is executed in the same manner as for the start method and the end method deactivates the cart object to be handled by the WWW browser.

Next, shopping on the WWW browser window, that is, executing the put method and the buy method of the cart object by request from the WWW browser will be explained below. It is assumed that an HTML-format file hyper text including links of commodities that allow the user to input a commodity identifier thereto (Links allowing the user to input data thereto are, in fact, forms in HTML-format file hypertexts, but the representation of links instead of forms is used herein) as well as the buy link is shown on the WWW browser window. In these links of commodities, the cart object code identifier, the object data identifier of the cart object assigned to the WWW browser, and the put method name are embedded, and a commodity identifier input thereto by the user is used as the argument to the method. The action that the user inputs an commodity identifier to a commodity link and selects the link means that the user selects the commodity input thereto. In the buy link, the cart object code identifier, the object data identifier of the cart object assigned to the WWW browser, and the buy method name are embedded. The action that the user selects this link means that the user determines to buy the commodity or commodities that the user has selected.

Wen the user inputs an commodity identifier to a commodity link and selects the link on the WWW browser window, a request message containing the object data identifier and the commodity identifier as the argument to the method is generated. In the same manner as for browsing a commodity list on the WWW browser window, the request message is transferred to the object invocation unit 220-a on the server-run computer 200-a. The object invocation unit 220-a obtains the cart object from the object access unit 310 on the managing computer 300 and executes the put method. The put method adds the commodity identifier as the argument passed thereto to the appropriate member of the cart object, and consequently the object data is altered. Then, the object invocation unit 220-a requests the object access unit 310 on the managing computer 300 to overwrite the object data of the cart object, because the put method is a method of synchronized and write attributes. The object data of the cart object in the object data table 340 is overwritten with the object data to which the commodity identifier has been added. Thereafter, the methods of the object can read the added commodity identifier.

When the user inputs another commodity identifier to another commodity link and selects the link on the WWW browser window and the put method of the cart object is executed again, the specified commodity identifier is added to the member in position just after the preceding commodity identifier.

According to how the router with a load balancing feature selects a server-run computer, the put method may be executed on the server-run computer 200-a at the first time of remote object invocation and on the server-run computer 200-b at the second time of remote object invocation. If the user splits the WWW browser window into sub-windows, inputs different commodity identifiers on the sub-windows, and simultaneously selects the links of the commodities, the put method execution is serialized, because the put method is a method of synchronized and write attributes.

When the user selects the buy link on the WWW browser window, the same processing as the buy method execution is performed. The buy method saves the commodity identifier or identifiers added to the member of the cart object into the commodity database.

Then, system expansion to cope with rapid traffic increase in the present application example will be explained below. If rapid increase of the access to the shopping system occurs beyond the processing capacity of the server-run computers, a new computer must be added to the cluster of the server-run computers. In this case, system expansion is possible by connecting a new computer equipped with a WWW server and the object invocation unit to the network and altering the system operation such that the router with a load balancing feature sends request messages to the new computer as well.

Furthermore, system service alteration to meet a service change request in the present application example will be explained below. If, for example, the commodity list display form is altered, the specification of the list method of the catalog object must be altered. Such system service alteration is possible by deactivating the catalog object on the managing computer 300, replacing the object by a new catalog object as the executable-formed object 360 made to the altered specification, and activating the new catalog object.

As explained above, the distributed object system in the present embodiments was designed to work as follows. With an object being not active on the sever-run computers in advance, in response to a remote object invocation from a client-run computer, the requested method is executed on one of the server-run computers with the object code and object data being obtained from the managing computer, and moreover the managing computer is requested to overwrite the object data. Therefore, when a server-run computer is added to the cluster of the server-run computers due to insufficient capacity, it is not necessary to activate objects in advance on the new server-run machine and easy system expansion is possible. According to the conventional method, when a new computer is added to the server cluster system, it is necessary to install objects on the new computer and activate the objects. By contrast, it is not necessary for the present embodiments to install and activate objects on the new computer, because objects are installed and activated only the managing server, and therefore system expansion is easy. (In other words, in response to a service request issued from a client, the managing computer retrieves the object (program) required for the service request and sends it to one of the server-run computers. Thus, the server-run computers need not to be furnished with objects in advance.)

Furthermore, the distributed object system in the present embodiments was designed such that objets are activated or deactivated only on the managing server without being done on a plurality of server-run computers. Thus, easy system alternation is possible; when an object is renewed, it is deactivated on the managing computer, replaced by a new object, and the new object is activated there. (By request from a client, the managing computer issues the request to activate or deactivate the object that runs on one of the server-run computers. Thus, the server-run computers need not perform object management.)

According to the conventional method, when renewing objects that are active on a plurality of server-run computers to alter a service provided by the server system, it is necessary to deactivate each object on each server-run computer, and replace it by a new object, and activate the new object.

By contrast, it is not necessary for the present embodiments to perform such object exchange on each server-run computer, because objects are installed and activated only on the managing server. System alteration is easy; an object to change is deactivated only on the managing computer, it is replaced by a new object, and the new object is activated there.

The present invention produces the effect of easy system expansion; when a new computer is added to the cluster of the server-run computers, objects need not be activated on the new computer in advance.

The present invention also produces the effect of easy system alteration; when a service provided by the server system is altered, an object to change is deactivated only on the managing computer, it is replaced by a new object, and the new object is activated there.

While a preferred embodiment has been described, variations thereto will occur to those skilled in the art within the scope of the present inventive concepts which are delineated by the following claims.

What is claimed is:

1. An object management method applicable to distributed object system, which includes at least one client computer at least one server computer, and at least one managing computer, the method comprising:

providing the at least one server computer with a load balancing feature.

obtaining object code and object data from the at least one managing computer in response to a remote object invocation from the at least one client computer, wherein said object code includes an attribute which indicates whether a read or a write is to be conducted during execution of a method defined by said object code, executing a requested method of the object on the at least one server computer; and performing object data overwrite on the at least one managing computer, when the attribute indicates that a write is to be conducted during execution of said method defined by said object code.

2. The method of claim 1, comprising:

at least one of activating objects and deactivating objects only on the at least one managing computer.

3. The method of claim 1, comprising:

performing senalized object invocation and method execution on the at least one server computer when a plurality of remote object invocations of a same object to execute a synchronized method of the object are issued from the at least one client-run computer.

4. The method of claim 1, comprising:

performing concurrent object invocation and method execution on the at least one server computer when a plurality of remote object invocations of a same object to execute a non-synchronized method of the object are issued from the at least one client-run computer.

5. The method of claim 1, comprising:

requesting the at least one managing computer to overwrite the object data and change the object data use flag when a write method is executed on the at least one server-run computer.

6. The method of claim 1, comprising:

performing both object data overwrite and object data use flag change on the at least one server computer when a read-only and non-synchronized method is executed on the at least one server-run computer.

7. The method of claim 1, comprising:

requesting the at least one managing computer to simply update the object data use flag when a read-only and synchronized method is executed on the at least one server computer.

8. The method of claim 1, comprising:

providing an object database containing catalog object and data and cart object and data.

9. A server computer, comprising:

an object invocation unit; and a load balancing unit for selecting the server computer to perform a method execution task according to a load condition and for sending a request message to the object invocation unit of the selected server computer, wherein the object invocation unit receives the request message from the load balancing unit, sends a request for object code and object data to a managing computer, receives object code and object data from the managing computer, said object code includes an attribute which indicates whether a read or a write is to be conducted during execution of a method defined by said object code, executes the requested method, and sends object data fixed after said method has been executed and a request for object data overwrite to the managing computer, when the attribute indicates that a write is to be conducted during execution of said method defined by said object code.

10. A managing computer, comprising:

an object access unit for receiving a request to obtain object code and object data from a server computer, obtaining object code from an object code table and obtaining object data from an object data table, said object code includes an attribute which indicates whether a read or a write is to be conducted dung execution of a method defined by said object code, sending the obtained object code and the obtained object data to the server computer, receiving object data fixed after said method has been executed and a request for object data overwrite, and writing object data fixed after said method has been executed over corresponding object data in the object data table, when the attribute indicates that a write is to be conducted during execution of said method defined by said object code; and an object manager unit for receiving a command to activate an object from an object management user program, retrieving the object from a database of executable-formed objects, registering object code into an object code table wherein object codes are stored, and registering object data into an object data into an object data table wherein object data are stored, wherein the object management user program provides at least one object activation command and at least one object deactivation command to the object manager unit, and wherein the database of executable-formed objects comprising the objects are represented as executable programs.

11. A program for implementing an object management method in a distributed object system, the distributed object system including at least one client computer, at least one server computer, and at least one managing computer, the program when executed causes the distributed object system to perform the steps of:

providing the at least one server computer with a load balancing feature;

obtaining object code and object data from the at least one managing computer in response to a remote object invocation from the at least one client-run computer, wherein said object code includes an attribute which indicates whether a read or a write is to be conducted during execution of a method defined by said object code, executing a requested method of the object on the at least one server-run computer, and performing object data overwrite on the at least one managing computer, when the attribute indicates that a write is to be conducted during execution of said method defined by said object code.

* * * * *